United States Patent
Berner et al.

(10) Patent No.: US 6,789,065 B2
(45) Date of Patent: Sep. 7, 2004

(54) SYSTEM, METHOD AND COMPUTER PROGRAM PRODUCT FOR POINT-TO-POINT VOICE-ENABLED DRIVING DIRECTIONS

(75) Inventors: Mikael Berner, San Jose, CA (US); Kevin Stone, Sunnyvale, CA (US); Lisa Guerra, Los Altos, CA (US); Kavita Gaitonde, Sunnyvale, CA (US)

(73) Assignee: BeVocal, Inc, Mountain View, CA (US)

( * ) Notice: Subject to any disclaimer, the term of this patent is extended or adjusted under 35 U.S.C. 154(b) by 0 days.

(21) Appl. No.: 09/769,903

(22) Filed: Jan. 24, 2001

(65) Prior Publication Data

US 2002/0133351 A1 Sep. 19, 2002

(51) Int. Cl.[7] .............................................. G10L 15/00
(52) U.S. Cl. ...................... 704/275; 704/270; 704/251; 701/200
(58) Field of Search ................................ 704/246, 251, 704/270, 235, 260, 272, 275; 701/200, 201, 202, 209, 211, 213

(56) References Cited

U.S. PATENT DOCUMENTS

| | | | |
|---|---|---|---|
| 4,581,755 A | 4/1986 | Sakoe | 381/42 |
| 5,041,983 A * | 8/1991 | Nakahara et al. | 701/209 |
| 5,177,685 A * | 1/1993 | Davis et al. | 455/456 |
| 5,274,560 A * | 12/1993 | LaRue | 701/202 |
| 5,353,377 A | 10/1994 | Kuroda et al. | 395/2.65 |
| 5,638,425 A | 6/1997 | Meador, III et al. | 379/88 |
| 5,732,394 A | 3/1998 | Nakadai et al. | 704/255 |
| 5,754,430 A * | 5/1998 | Sawada | 701/209 |
| 5,835,881 A * | 11/1998 | Trovato et al. | 701/211 |
| 6,044,322 A | 3/2000 | Stieler | 701/120 |
| 6,067,521 A * | 5/2000 | Ishii et al. | 704/275 |
| 6,073,096 A | 6/2000 | Gao et al. | 704/245 |
| 6,091,956 A * | 7/2000 | Hollenberg | 455/456 |
| 6,108,631 A * | 8/2000 | Ruhl | 704/270 |
| 6,112,174 A * | 8/2000 | Wakisaka et al. | 64/436 |
| 6,138,094 A | 10/2000 | Miet et al. | 704/233 |
| 6,272,457 B1 * | 8/2001 | Ford et al. | 704/9 |
| 6,317,684 B1 * | 11/2001 | Roeseler et al. | 701/202 |

* cited by examiner

*Primary Examiner*—Daniel Abebe
(74) *Attorney, Agent, or Firm*—Silicon Valley IP Group; Kevin J. Zilka

(57) ABSTRACT

A system, method and computer program product are afforded for providing voice-enabled driving directions. Initially, an utterance representative of a destination address is received. Thereafter, the utterance is transcribed utilizing a speech recognition process. An origin address is then determined. A database is subsequently for queried generating driving directions based on the destination address and the origin address.

1 Claim, 15 Drawing Sheets

SYSTEM, METHOD AND COMPUTER PROGRAM PRODUCT FOR POINT-TO-POINT VOICE-ENABLED DRIVING DIRECTIONS

RELATED APPLICATIONS

The present application is related to a co-pending application which was filed concurrently herewith under the title "SYSTEM, METHOD AND COMPUTER PROGRAM PRODUCT FOR A DISTRIBUTED SPEECH RECOGNITION TUNING PLATFORM" which is incorporated herein by reference in its entirety.

FIELD OF THE INVENTION

The present invention relates to speech recognition, and more particularly to large-scale speech recognition.

BACKGROUND OF THE INVENTION

Techniques for accomplishing automatic speech recognition (ASR) are well known. Among known ASR techniques are those that use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include subgrammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

Products and services that utilize some form of automatic speech recognition ("ASR") methodology have been recently introduced commercially. For example, AT&T has developed a grammar-based ASR engine called WATSON that enables development of complex ASR services. Desirable attributes of complex ASR services that would utilize such ASR technology include high accuracy in recognition; robustness to enable recognition where speakers have differing accents or dialects, and/or in the presence of background noise; ability to handle large vocabularies; and natural language understanding. In order to achieve these attributes for complex ASR services, ASR techniques and engines typically require computer-based systems having significant processing capability in order to achieve the desired speech recognition capability. In addition to WATSON, numerous ASR services are available which are typically based on personal computer (PC) technology.

One application of ASR techniques is the voice entry of addresses, i.e. street names, cities, etc. for the purpose of receiving directions. One example of such application is disclosed in U.S. Pat. No. 6,108,631. Such invention relates to an input system for at least location and/or street names, including an input device, a data source arrangement which contains at least one list of locations and/or streets, and a control device which is arranged to search location or street names, entered via the input device, in a list of locations or streets in the data source arrangement. In order to simplify the input of location and/or street names, the data source arrangement contains not only a first list of locations and/or streets with alphabetically sorted location and/or street names, but also a second list of locations and/or streets with location and/or street names sorted on the basis of a frequency criterion. A speech input system of the input device conducts input in the form of speech to the control device. The control device is arranged to perform a sequential search for a location or street name, entered in the form of speech, as from the beginning of the second list of locations and/or streets.

Such prior art direction services supply to a traveler automatically developed step-by-step directions for travel from a starting point to a destination. Typically these directions are a series of steps which detail, for the entire route, a) the particular series of streets or highways to be traveled, b) the nature and location of the entrances and exits to/from the streets and highways, e.g., turns to be made and exits to be taken, and c) optionally, travel distances and landmarks.

One difficulty that arises when attempting to identify and differentiate between the plethora of streets is the ability to accurately identify the street name corresponding to an utterance of a user. This problem is exacerbated as a result of the prevalent reuse of names, the varied pronunciations thereof, and the overall massive amount of street names in existence.

There is therefore a need for an improved technique of recognizing street names and the like for providing driving directions.

DISCLOSURE OF THE INVENTION

A system, method and computer program product are afforded for providing voice-enabled driving directions. Initially, an utterance representative of a destination address is received. Thereafter, the utterance is transcribed utilizing a speech recognition process. An origin address is then determined. A database is subsequently for queried generating driving directions based on the destination address and the origin address.

In one embodiment of the present invention, the origin address may be determined utilizing the speech recognition process. Further, the speech recognition process may include querying one of a plurality of databases based on the origin address. Such database that is queried by the speech recognition process may include grammars representative of addresses local to the origin address.

In another aspect of the present invention, the addresses may include street names. Further, the utterance may be received utilizing a network.

DESCRIPTION OF THE PREFERRED EMBODIMENTS

Figure 1:
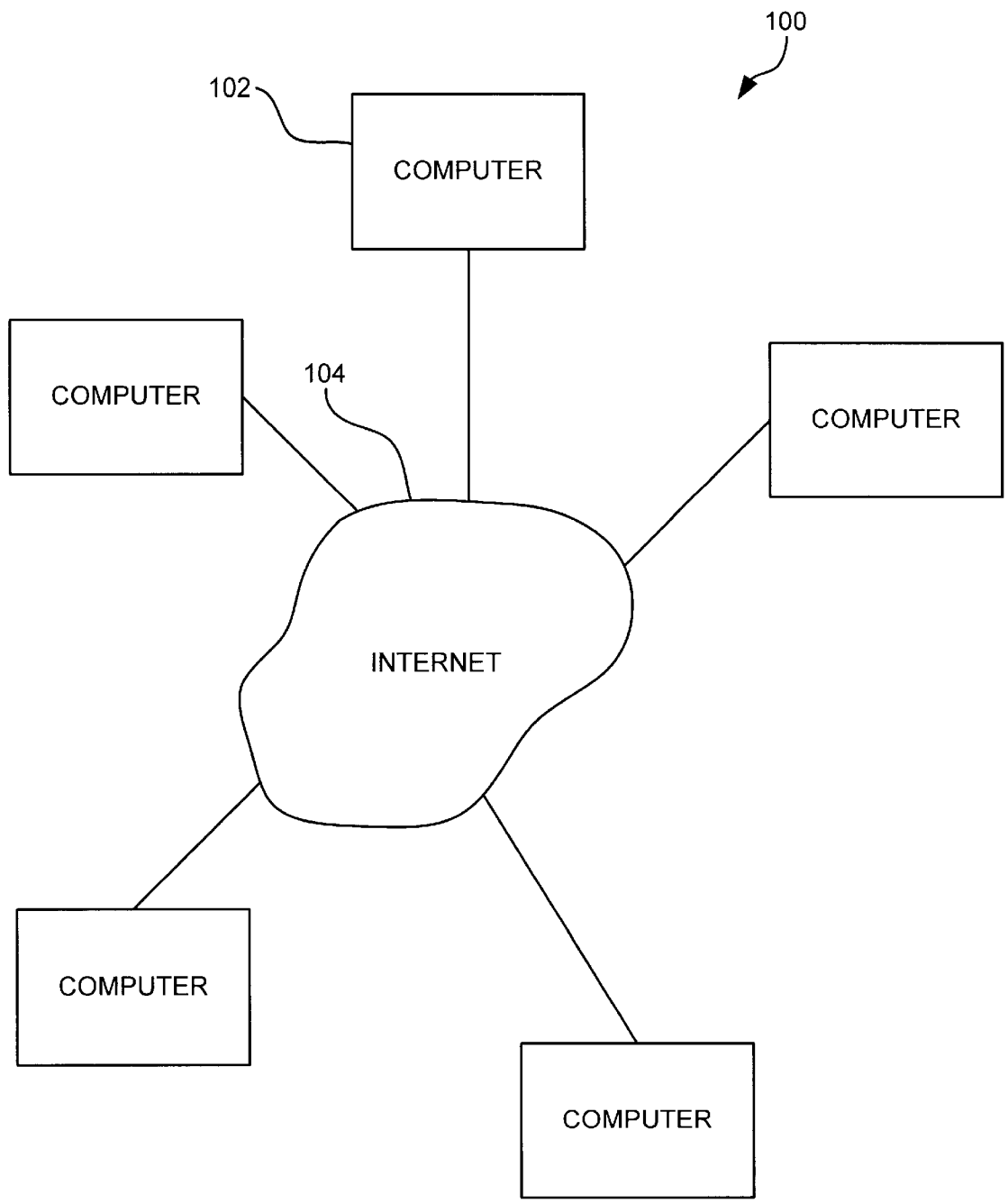
FIG. 1 illustrates an exemplary environment in which the present invention may be implemented.

FIG. 1 illustrates an exemplary environment 100 in which the present invention may be implemented. As shown, a plurality of computers 102 are interconnected via a network 104. In one embodiment, such network includes the Internet. It should be noted, however, that any type of network may be employed, i.e. local area network (LAN), wide area network (WAN), etc.

Figure 2:
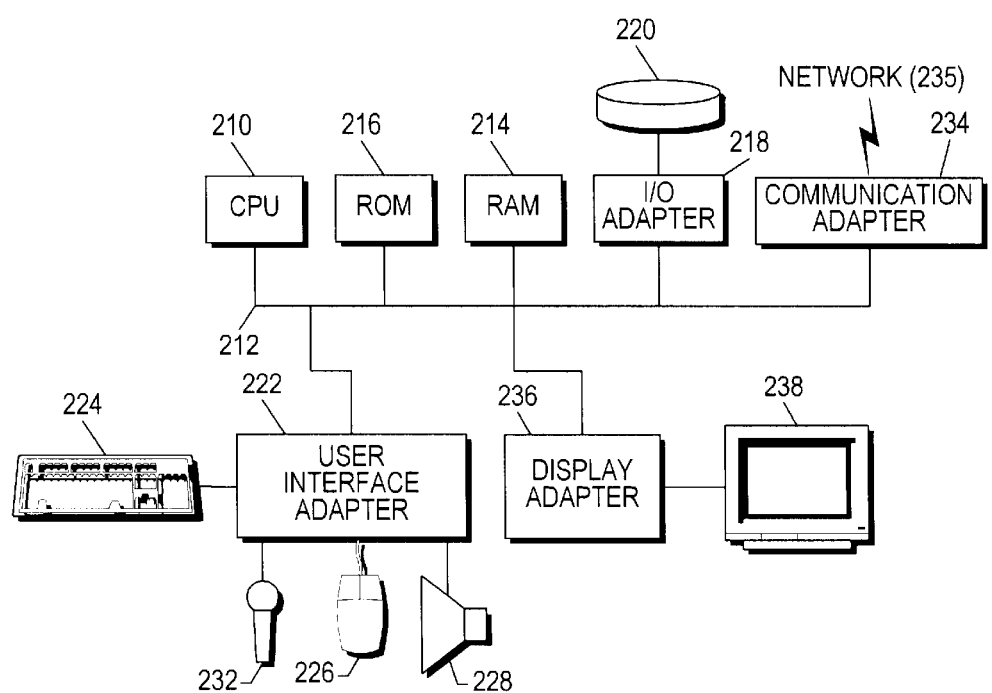
FIG. 2 shows a representative hardware environment associated with the computer systems of FIG. 1.

FIG. 2 shows a representative hardware environment associated with the computer systems 102 of FIG. 1. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (TOM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard, classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small-scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Preferred Embodiments

Initially, a database must first be established with all of the necessary grammars. In one embodiment of the present invention, the database is populated with a multiplicity of street names for voice recognition purposes. In order to get the best coverage for all the street names, data from multiple data sources may be merged.

Figure 3:
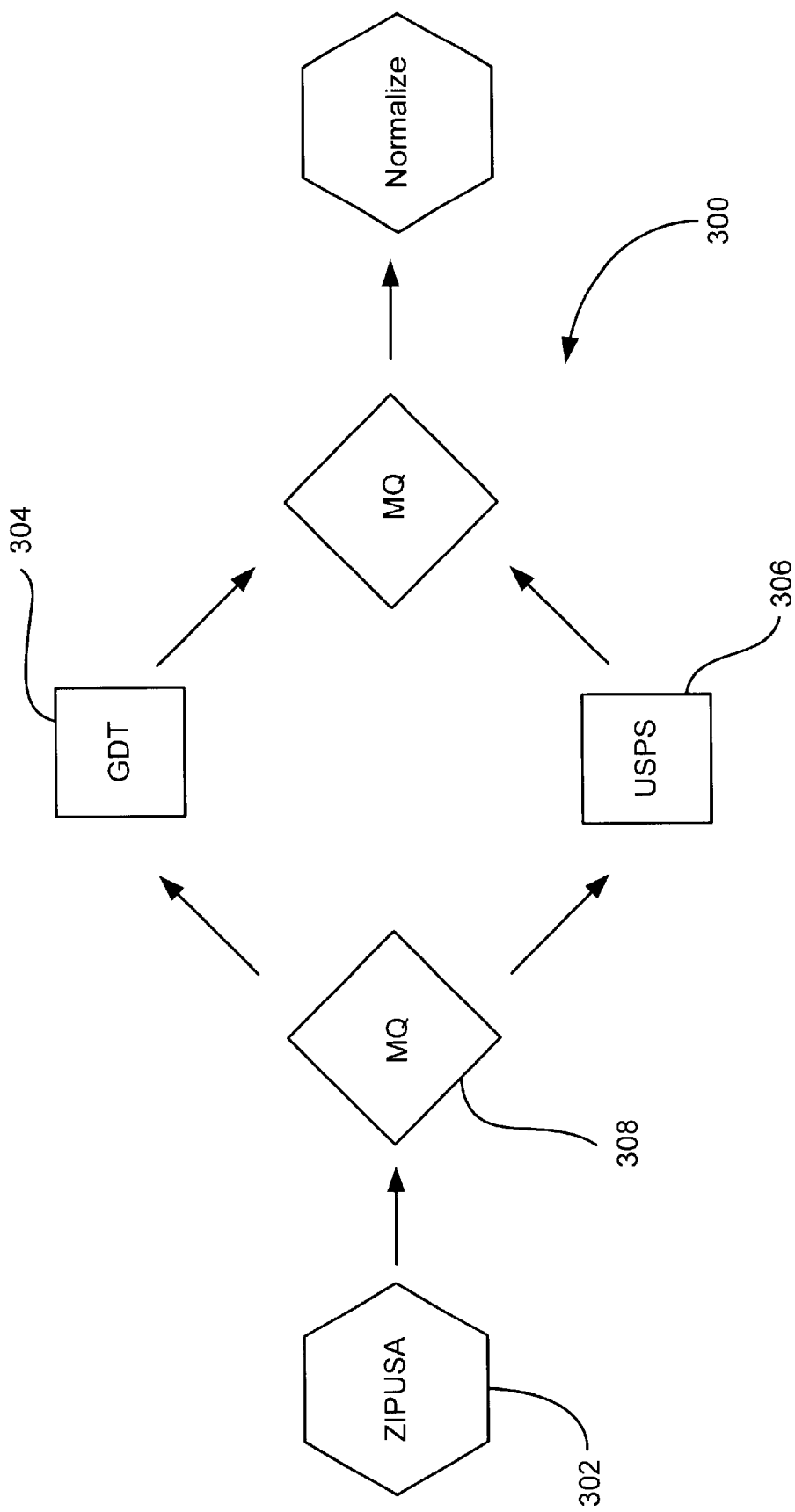
FIG. 3 is a schematic diagram showing one exemplary combination of databases that may be used for generating a collection of grammars.

FIG. 3 is a schematic diagram showing one exemplary combination of databases 300. In the present embodiment, such databases may include a first database 302 including city names and associated zip codes (i.e. a ZIPUSA database), a second database 304 including street names and zip codes (i.e. a Geographic Data Technology (GDT) database), and/or a United States Postal Services (USPS) database 306. In other embodiments, any other desired databases may be utilized. Further tools may also be utilized such as a server 308 capable of verifying street, city names, and zip codes.

Figure 4:
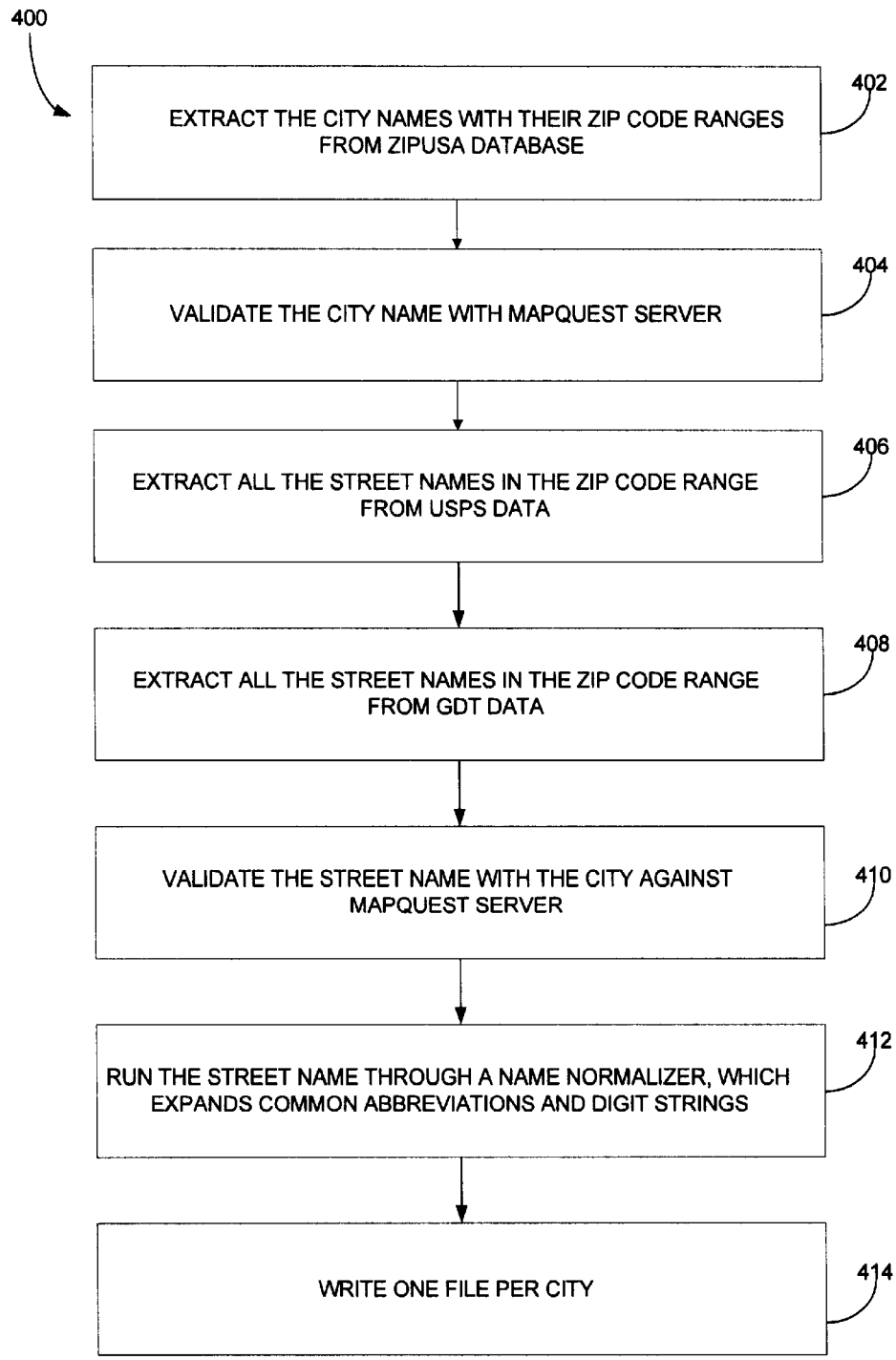
FIG. 4 illustrates a gathering method for collecting a large number of grammars such as all of the street names in the United States of America using the combination of databases shown in FIG. 3.

FIG. 4 illustrates a gathering method 400 for collecting a large number of grammars such as all of the street names in the United States of America using the combination of databases 300 shown in FIG. 3. As shown in FIG. 4, city names and associated zip code ranges are initially extracted from the ZIPUSA database. Note operation 402. It is well known in the art that each city has a range of zip codes associated therewith. As an option, each city may further be identified using a state and/or county identifier. This may be necessary in the case where multiple cities exist with similar names.

Next, in operation 404, the city names are validated using a server capable of verifying street names, city names, and zip codes. In one embodiment, such server may take the form of a MapQuest server. This step is optional for ensuring the integrity of the data.

Figure 4A:
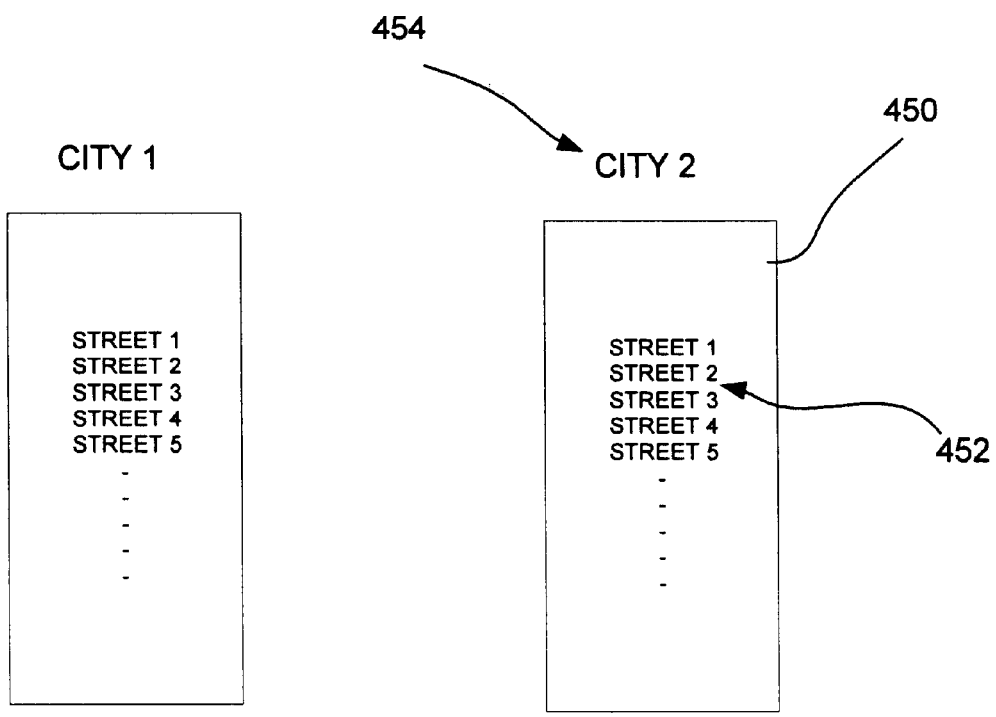
FIG. 4A illustrates a pair of exemplary lists showing a plurality of streets names organized according to city.

Thereafter, all of the street names in the zip code range are extracted from USPS data in operation 406. In a parallel process, the street names in the zip code range are similarly extracted from the GDT database. Note operation 408. Such street names are then organized in lists according to city. FIG. 4A illustrates a pair of exemplary lists 450 showing a plurality of streets names 452 organized according to city 454. Again, in operation 410, the street names are validated using the server capable of verifying street names, city names, and zip codes.

It should be noted that many of the databases set forth hereinabove utilize abbreviations. In operation 412, the street names are run through a name normalizer, which expands common abbreviations and digit strings. For example, the abbreviations "St." and "Cr." can be expanded to "street" and "circle," respectively.

In operation 414, a file is generated for each city. Each of such files delineates each of the appropriate street names.

Figure 5:
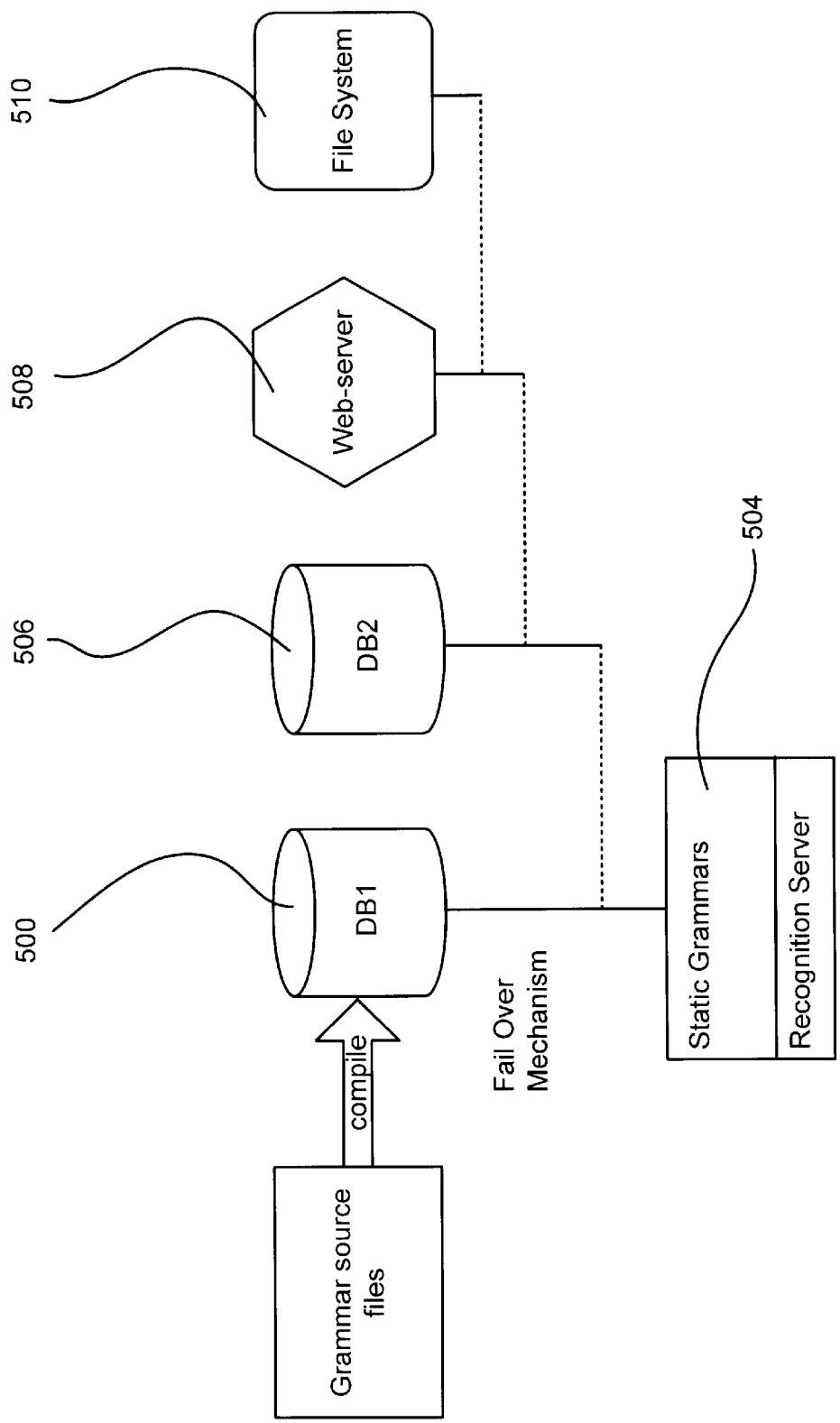
FIG. 5 illustrates a plurality of databases of varying types on which the grammars may be stored for retrieval during speech recognition.

FIG. 5 illustrates a plurality of databases 500 of varying types on which the grammars may be stored for retrieval during speech recognition. The present embodiment takes into account that only a small portion of the grammars will be used heavily used during use. Further, the overall amount of grammars is so large that it is beneficial for it to be distributed across several databases. Because network connectivity is involved, the present embodiment also provides for a fail-over scheme.

As shown in FIG. 5, a plurality of databases 500 are included having different types. For example, such databases may include a static database 504, dynamic database 506, web-server 508, file system 510, or any other type of database. Table 1 illustrates a comparison of the foregoing types of databases.

TABLE 1

| | When Compiled | On Server? | Protocol |
| --- | --- | --- | --- |
| Static | Offline | Yes | Proprietary Vendor |
| Dynamic | Offline | No | ORACLE ™ OCI |
| Web server | Runtime | No | HTTP |
| File System | Runtime | No | File System Access |

Figure 6:
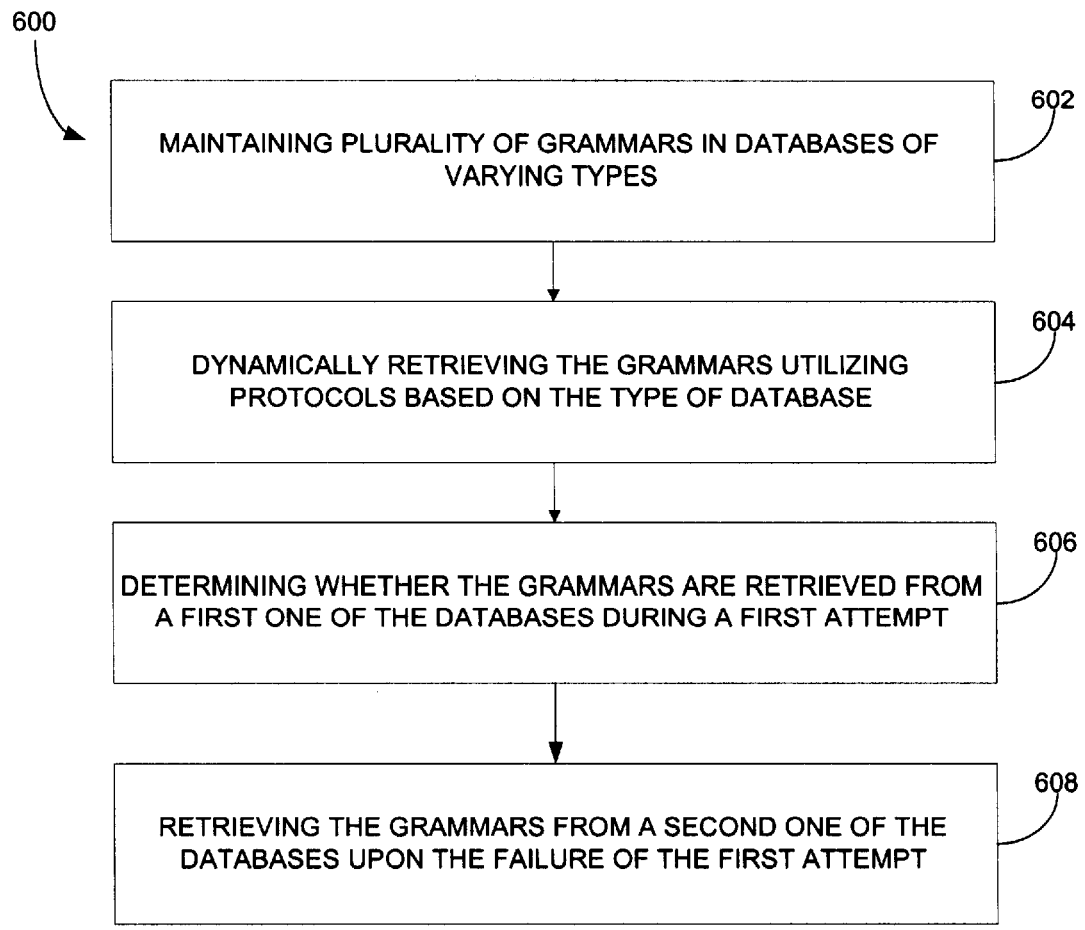
FIG. 6 illustrates a method for speech recognition using heterogeneous protocols associated with the databases of FIG. 5.

FIG. 6 illustrates a method 600 for speech recognition using heterogeneous protocols associated with the databases of FIG. 5. Initially, in operation 602, a plurality of grammars, i.e. street names, are maintained in databases of different types. In one embodiment, the types may include static, dynamic, web server, and/or file system, as set forth hereinabove.

During use, in operation 604, the grammars are dynamically retrieved utilizing protocols based on the type of the database. Retrieval of the grammars may be initially attempted from a first database. The database subject to such initial attempt may be selected based on the type, the specific content thereof, or a combination thereof.

For example, static databases may first be queried for the grammars to take advantage of their increased efficiency and speed, while the remaining types may be used as a fail-over mechanism. Moreover, the static database to be initially queried may be populated with grammars that are most prevalently used. By way of example, a static database with just New York streets may be queried in response to a request from New York. As such, one can choose to include certain highly used grammars as static grammars (thus reducing network traffic), while other databases with lesser used grammars may be accessible through various other network protocols.

Further, by storing the same grammar in more than one node in such a distributed architecture, a control flow of the grammar search algorithm could point to a redundant storage area if required. As such, a fail-over mechanism is provided. By way of example, in operation 606, it may be determined whether the grammars may be retrieved from a first one of the databases during a first attempt. Upon the failure of the first attempt, the grammars may be retrieved from a second one of the databases, and so on. Note operation 608.

The present approach thus includes distributing grammar resources across a variety of data storage types (static packages, dynamic grammar databases, web servers, file systems), and allows the control flow of the application to search for the grammars in all the available resources until it is found.

Figure 7:
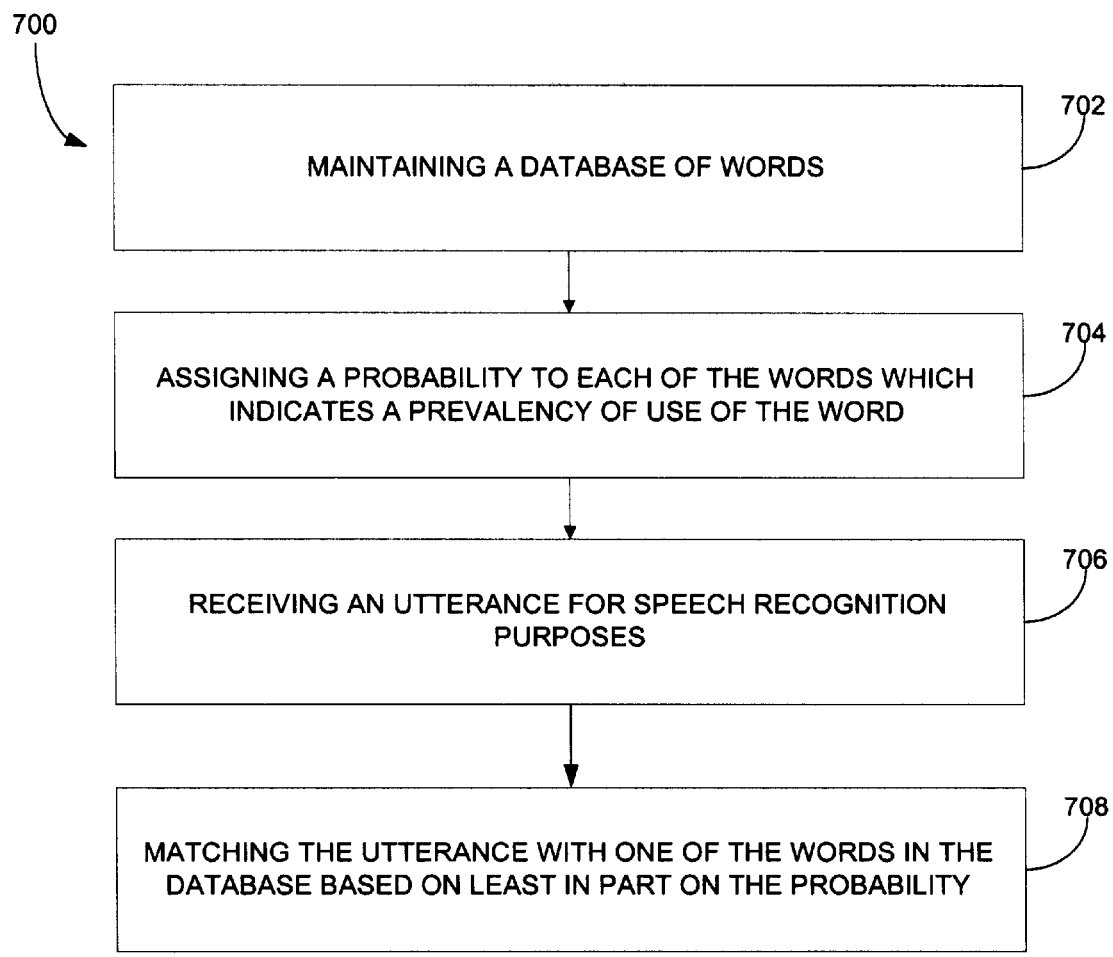
FIG. 7 illustrates a method for providing a speech recognition method that improves the recognition of street names, in accordance with one embodiment.

FIG. 7 illustrates a method 700 for providing a speech recognition method that improves the recognition of street names, in accordance with one embodiment of the present invention. In order to reduce the phonetic confusability due to the existence of smaller streets whose names happen to be phonetically similar to that of more popular streets, traffic count statistics may be used when recognizing the grammars to weigh each street.

During operation 702, a database of words is maintained. Initially, in operation 704, a probability is assigned to each of the words, i.e. street names, which indicates a prevalency of use of the word. As an option, the probability may be determined using statistical data corresponding to use of the streets. Such statistical data may include traffic counts such as traffic along the streets and along intersecting streets.

The traffic count information may be given per intersection. One proposed scheme to extract probabilities on a street-to-street basis will now be set forth. The goal is to include in the grammar probabilities for each street that would predict the likelihood users will refer to it. It should be noted that traffic counts are an empirical indication of the importance of a street.

In use, data may be used which indicates an amount of traffic at intersections of streets. Equation #1 illustrates the form of such data. It should be noted that data in such form is commonly available for billboard advertising purposes.

Equation #1

$$\text{TrafficIntersection (streetA, streetB)}=X$$

$$\text{TrafficIntersection (streetA, streetC)}=Y$$

$$\text{TrafficIntersection (streetA, streetD)}=Z$$

$$\text{TrafficIntersection (streetB, streetC)}=A$$

To generate a value corresponding to a specific street, all of the intersection data involving such street may be aggregated. Equation #2 illustrates the manner in which the intersection data is aggregated for a specific street.

Equation #2

$$\text{Traffic (streetA)}=X+Y+Z$$

The aggregation for each street may then be normalized. One exemplary method of normalization is represented by Equation #3.

Equation #3

$$\text{Normalization [Traffic(streetA)]}=\log_{10}(X+Y+Z)$$

Such normalized values may then be used to categorize each of the streets in terms of prevelancy of use. Preferably, this is done separately for each city. Each category is assigned a constant scalar associated with the popularity of the street. By way of example, the constant scalars 1, 2 and 3 may be assigned to normalized aggregations 0.01, 0.001, and 0.0001, respectively. Such popularity may then be added to the city grammar file to be used during the speech recognition process.

During use, an utterance is received for speech recognition purposes. Note operation 706. Such utterance is matched with one of the words in the database based at least in part on the probability, as indicated by operation 708. For example, when confusion is raised as to which of two or more streets an utterance is referring, the street with the highest popularity (per the constant scalar indicator) is selected as a match.

Exemplary Speech Recognition Process

An exemplary speech recognition process will now be set forth. It should be understood that the present example is offered for illustrative purposes only, and should not be construed as limiting in any manner.

Figure 8:
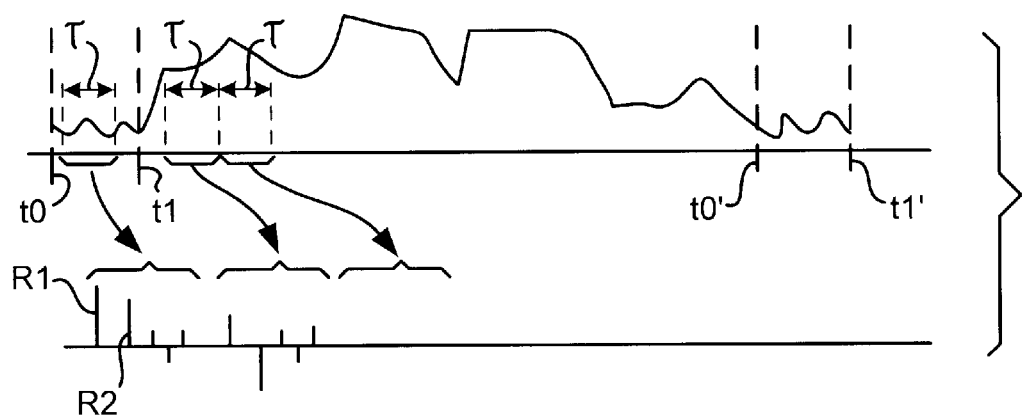
FIGS. 8–11 illustrate an exemplary speech recognition process, in accordance with one embodiment of the present invention.

FIG. 8 shows a timing diagram which represents the voice signals in A. According to the usual speech recognition techniques, such as explained in above-mentioned European patent, evolutionary spectrums are determined for these voice signals for a time tau represented in B in FIG. 8 by the spectral lines R1, R2 . . . . The various lines of this spectrum obtained by fast Fourier transform, for example, constitute vectors. For determining the recognition of a word, these various lines are compared with those established previously which form the dictionary and are stored in memory.

Figure 10:
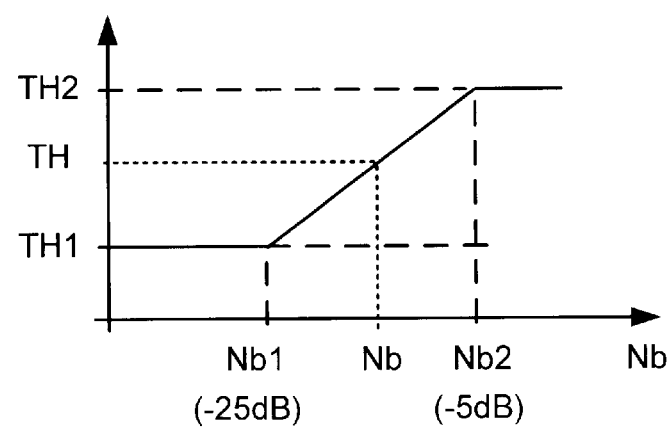
Figure 9:
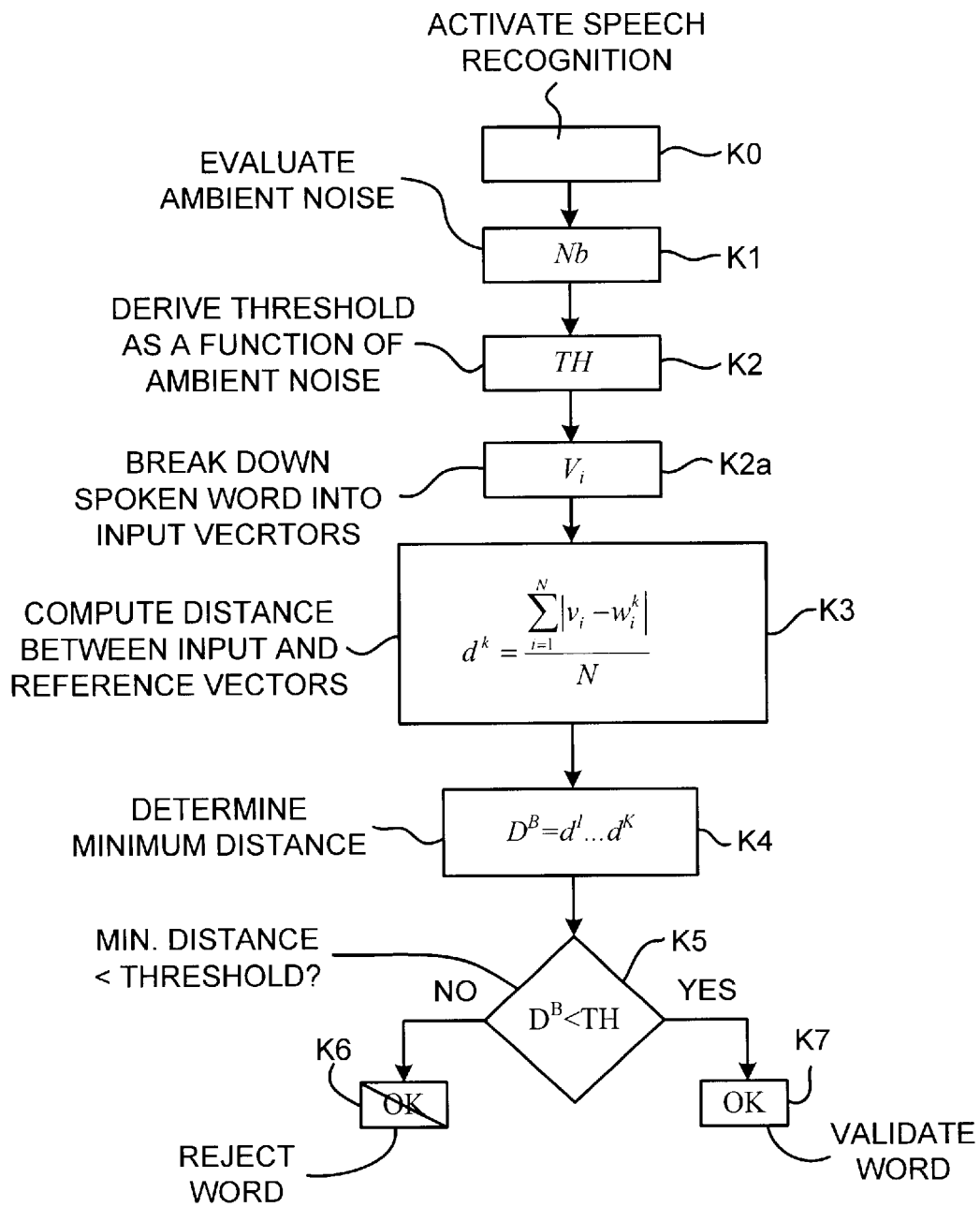

FIG. 9 shows the flow chart which explains the method according to the invention. Box K0 represents the activation of speech recognition; this may be made by validating an item on a menu which appears on the screen of the device. Box K1 represents the step of the evaluation of ambient noise. This step is executed between the instants t0 and t1 (see FIG. 8) between which the speaker is supposed not to speak, i.e. before the speaker has spoken the word to be recognized. Supposing Nb is this value which is expressed in dB relative to the maximum level (if one works with 8 bits, this maximum level 0 dB is given by 1111 1111). This measure is taken considering the mean value of the noise vectors, their moduli, or their squares. From this level measured in this manner is derived a threshold TH (box K2) as a function of the curve shown in FIG. 10.

Box K2a represents the breakdown of a spoken word to be recognized into input vectors $V_i$. Box K3 indicates the computation of the distances $d^k$ between the input vectors $V_i$ and the reference vectors $w^K_i$. This distance is evaluated based on the absolute value of the differences between the components of these vectors. In box K4 is determined the minimum distance $D^B$ among the minimum distances which have been computed. This minimum value is compared with the threshold value TH, box K5. If this value is higher than the threshold TH, the word is rejected in box K6, if not, it is declared recognized in box K7.

Figure 11:
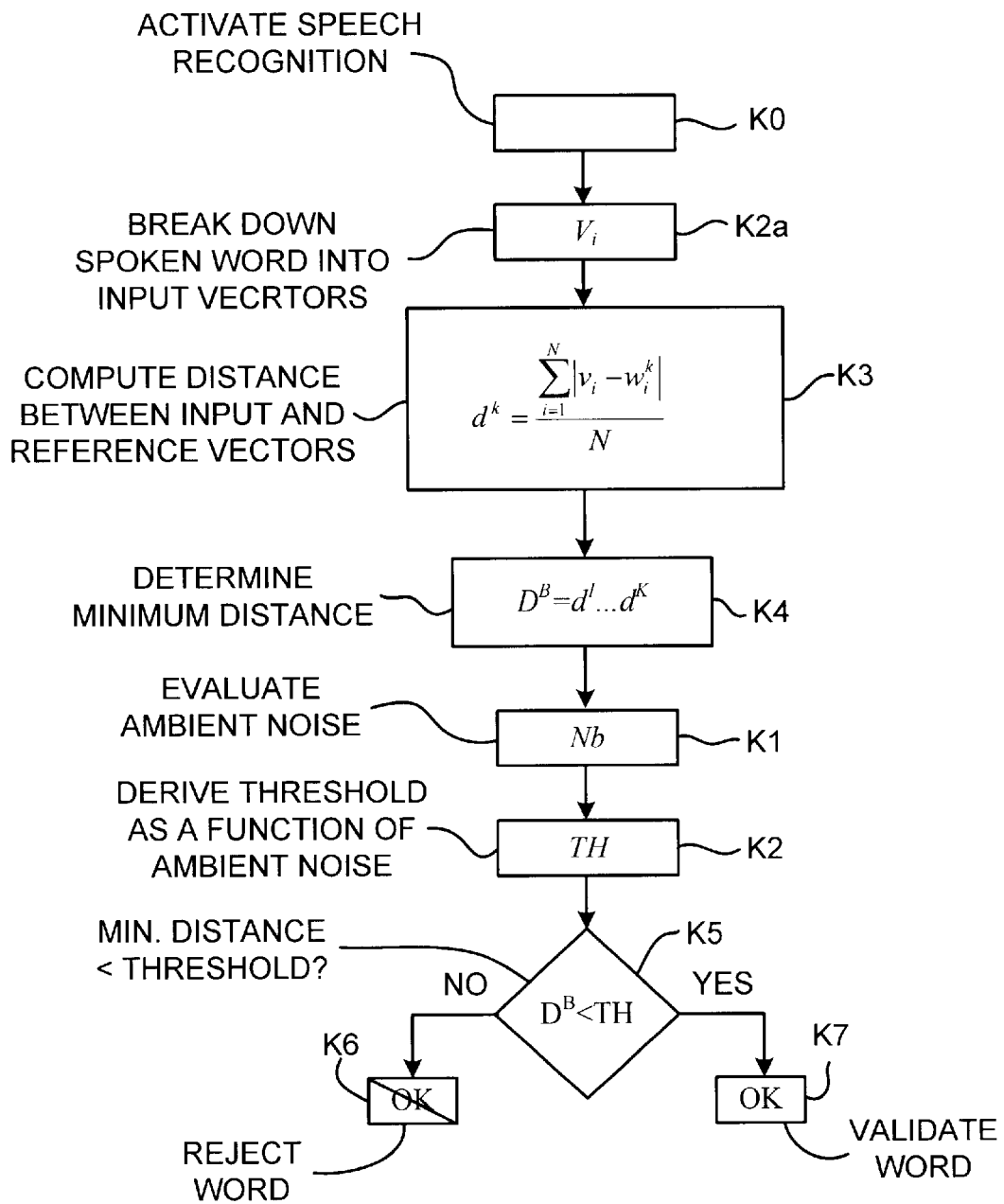

The order of various steps may be reversed in the method according to the invention. As this is shown in FIG. 11, the evaluation of the ambient noise may also be carried out after the speaker has spoken the word to be recognized, that is, between the instants t0' and t1' (see FIG. 8). This is translated in the flow chart of FIG. 11 by the fact that the steps K1 and K2 occur after step K4 and before decision step K5.

The end of this ambient noise evaluation step, according to a characteristic feature of the invention, may be signaled to the speaker in that a beep is emitted, for example, by a loudspeaker which then invites the speaker to speak. The present embodiment has taken into account that a substantially linear function of the threshold value as a function of the measured noise level in dB was satisfactory. Other functions may be found too, without leaving the scope of the invention therefore.

If the distances vary between a value from 0 to 100, the values of TH1 may be 10 and those of TH2 80 for noise levels varying from −25 dB to −5 dB.

Exemplary Applications

Various applications of the foregoing technology will now be set forth. It should be noted that such applications are for illustrative purposes, and should not be construed limiting in any manner.

Figure 12:
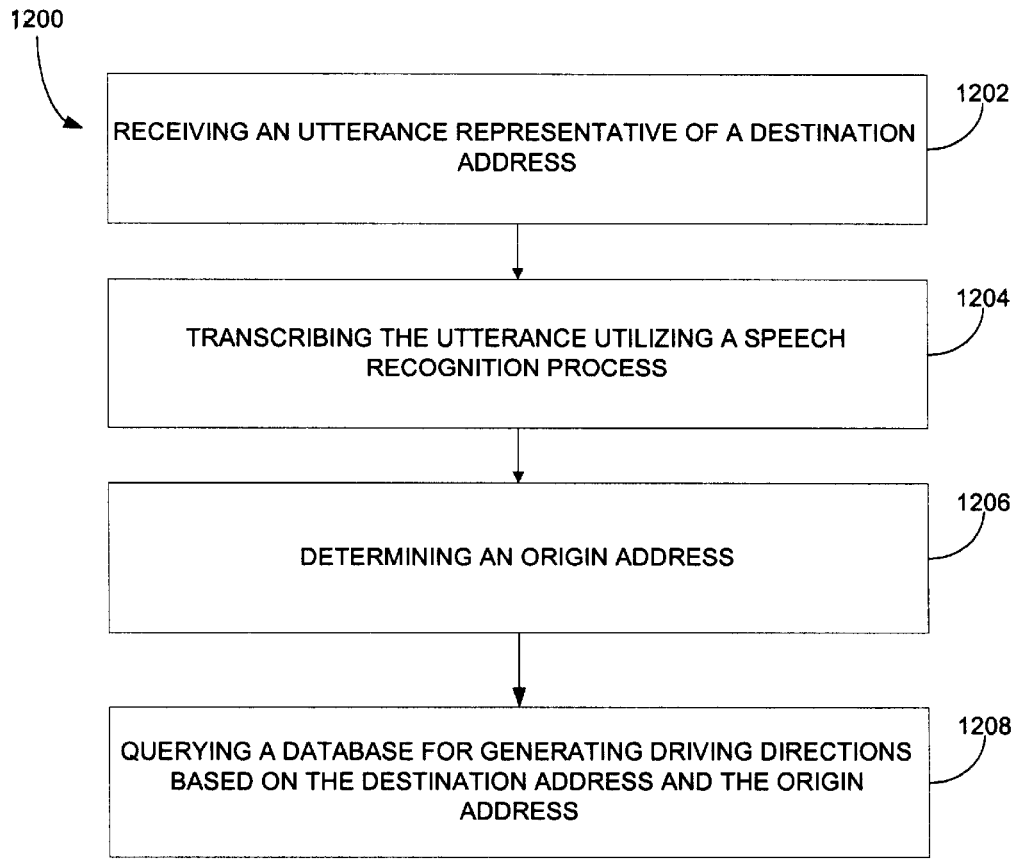
FIG. 12 illustrates a method for providing voice-enabled driving directions, in accordance with one exemplary application embodiment of the present invention.

FIG. 12 illustrates a method 1200 for providing voice-enabled driving directions. Initially, in operation 1202, an utterance representative of a destination address is received. It should be noted that the addresses may include street names or the like. Such utterance may also be received via a network.

Thereafter, in operation 1204, the utterance is transcribed utilizing a speech recognition process. As an option, the speech recognition process may include querying one of a plurality of databases based on the origin address. Such database that is queried by the speech recognition process may include grammars representative of addresses local to the origin address.

An origin address is then determined. Note operation 1206. In one embodiment of the present invention, the origin address may also be determined utilizing the speech recognition process. It should be noted that global positioning system (GPS) technology or other methods may also be utilized for such purpose.

A database is subsequently for queried generating driving directions based on the destination address and the origin address, as indicated in operation 1208. In particular, a server (such as a MapQuest server) may be utilized to generate such driving directions. Further, such driving directions may optionally be sounded out via a speaker or the like.

Figure 13:
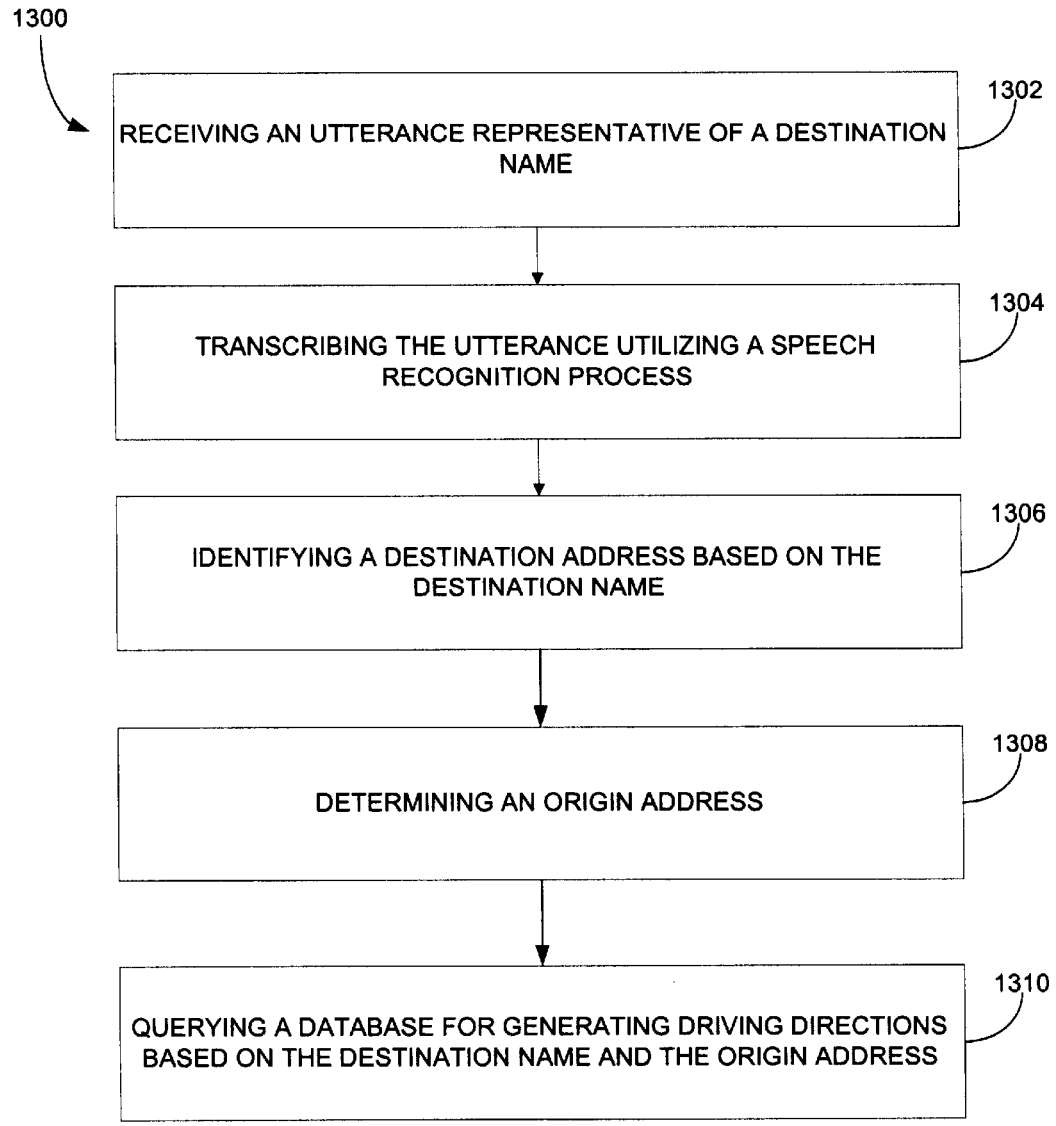
FIG. 13 illustrates a method for providing voice-enabled driving directions based on a destination name, in accordance with another exemplary application embodiment of the present invention.

FIG. 13 illustrates a method 1300 for providing voice-enabled driving directions based on a destination name. Initially, in operation 1302, an utterance representative of a destination name is received. Optionally, the destination name may include a category and/or a brand name. Such utterance may be received via a network.

In response to the receipt thereof, the utterance is transcribed utilizing a speech recognition process. See operation 1304. Further, in operation 1306, a destination address is identified based on the destination name. It should be noted that the addresses may include street names. To accomplish this, a database may be utilized which includes addresses associated with business names, brand names, and/or goods and services. Optionally, such database may include a categorization of the goods and services, i.e. virtual yellow pages, etc.

Still yet, an origin address is identified. See operation 1308. In one embodiment of the present invention, the origin address may be determined utilizing the speech recognition process. It should be noted that global positioning system (GPS) technology or other techniques may also be utilized for such purpose.

Based on such destination name and origin address, a database is subsequently queried for generating driving directions. Note operation 1310. Similar to the previous embodiment, a server (such as a MapQuest server) may be utilized to generate such driving directions, and such driving directions may optionally be sounded out via a speaker or the like.

Figure 14:
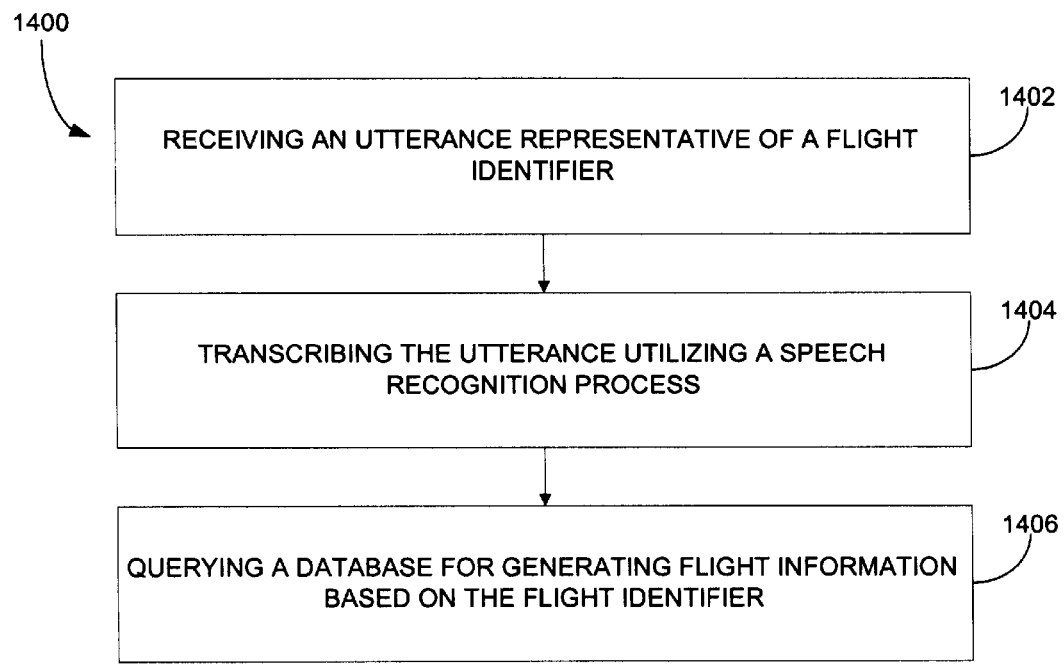
FIG. 14 illustrates a method for providing voice-enabled driving directions, in accordance with another exemplary application embodiment of the present invention.

FIG. 14 illustrates a method 1400 for providing voice-enabled driving directions. Initially, in operation 1402, an utterance is received representative of a flight identifier. Optionally, the flight identifier may include a flight number. Further, such utterance may be received via a network.

Utilizing a speech recognition process, the utterance is then transcribed. Note operation 1404. Further, in operation 1406, a database is queried for generating flight information based on the flight identifier. As an option, the flight information may include a time of arrival of the flight, a flight delay, or any other information regarding a particular flight.

Figure 15:
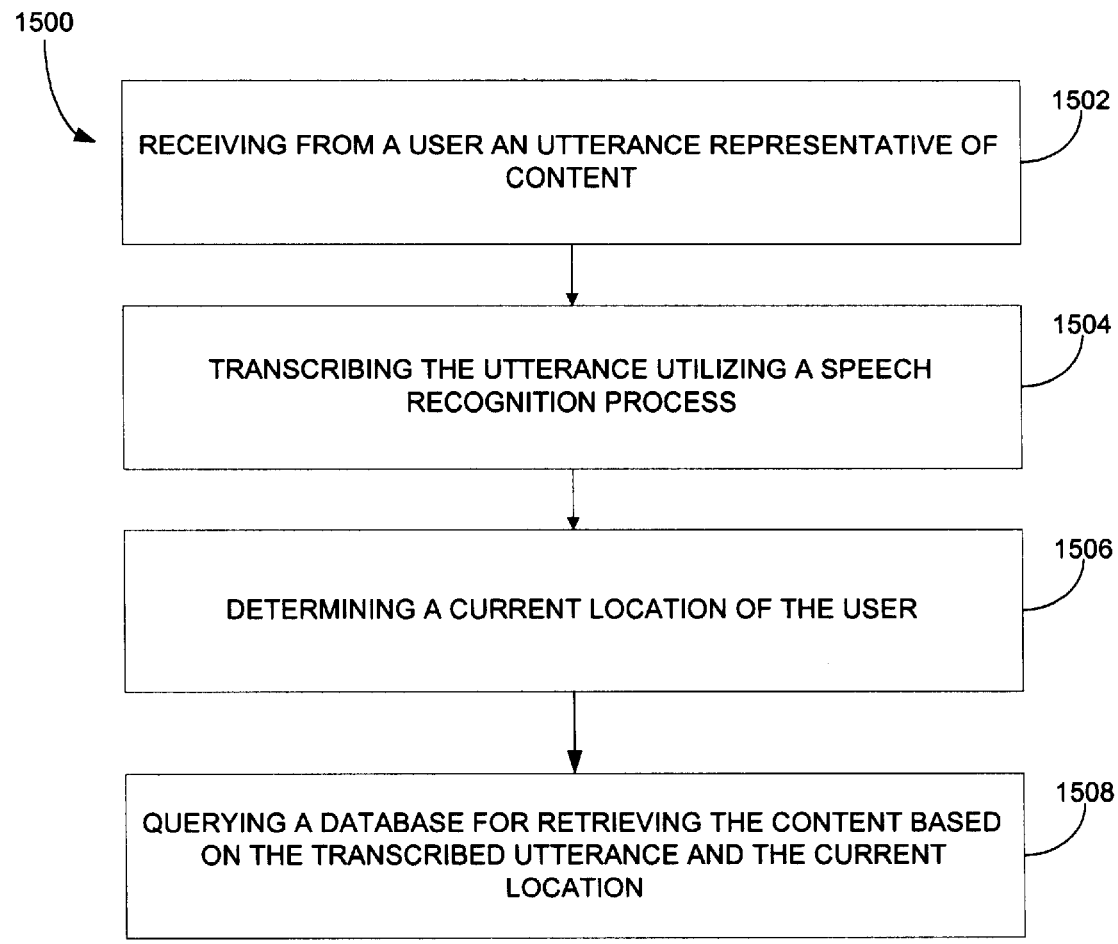
FIG. 15 illustrates a method for providing localized content, in accordance with still another exemplary application embodiment of the present invention.

FIG. 15 illustrates a method 1500 for providing localized content. Initially, an utterance representative of content is received from a user. Such utterance may be received via a network. Note operation 1502. In operation 1504, such utterance is transcribed utilizing a speech recognition process.

A current location of the user is subsequently determined, as set forth in operation 1506. In one embodiment of the present invention, the current location may be determined utilizing the speech recognition process. In another embodiment of the present invention, the current location may be determined by a source of the utterance. This may be accomplished using GPS technology, identifying a location of an associated inputting computer, etc.

Based on the transcribed utterance and the current location, a database is queried for generating the content. See operation 1508. Such content may, in one embodiment, include web-content taking the form of web-pages, etc.

As an option, the speech recognition process may include querying one of a plurality of databases based on the current address. It should be noted that the database queried by the speech recognition process may include grammars representative of the current location, thus facilitating the retrieval of appropriate content.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing voice-enabled driving directions, comprising:
   (a) receiving an utterance representative of a destination address including a street over a network;
   (b) transcribing the utterance utilizing a speech recognition process, wherein the speech recognition process includes:

(i) querying one of a plurality of databases of different types selected from the group consisting of static, dynamic, web server, and file system, (ii) dynamically retrieving grammars utilizing protocols based on the type of the database, (iii) determining whether the grammars are retrieved from a first one of the databases during a first attempt, and (iv) retrieving the grammars from a second one of the databases upon the failure of the first attempt, (v) wherein at least one of the databases is established based on a first source with a plurality of city names and associated zip codes, and a second source with a plurality of street names, the establishing being validated using a third source, (vi) wherein at least one of the databases assigns a probability to each of the grammars which indicates a prevalency of use of the grammars, the probability being determined using statistical data corresponding to use of streets associated with the grammars, and the utterance being matched with one of the grammars in the database based at least in part on the probability;

(c) determining an origin address, wherein the origin address is determined utilizing the speech recognition process; and (d) querying a database for generating driving directions based on the destination address and the origin address.

* * * * *

UNITED STATES PATENT AND TRADEMARK OFFICE
CERTIFICATE OF CORRECTION

PATENT NO. : 6,789,065 B2 Page 1 of 1
DATED : September 7, 2004
INVENTOR(S) : Mikael Berner et al.

It is certified that error appears in the above-identified patent and that said Letters Patent is hereby corrected as shown below:

<u>Title page,</u>
Item [75], Inventors, add -- Bertrand A. Damiba --.

Signed and Sealed this

Twenty-third Day of May, 2006

JON W. DUDAS
*Director of the United States Patent and Trademark Office*